US006697301B1

United States Patent
Ruffa

(10) Patent No.: US 6,697,301 B1
(45) Date of Patent: Feb. 24, 2004

(54) ACOUSTIC ARRAY DEPLOYMENT SYSTEM AND METHOD

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/244,924

(22) Filed: Sep. 11, 2002

(51) Int. Cl.$^7$ ............................................... H04B 11/00
(52) U.S. Cl. ...................................... 367/131; 367/173
(58) Field of Search .............................. 367/173, 153, 367/149, 131

(56) References Cited

U.S. PATENT DOCUMENTS 5,737,279 A * 4/1998 Carter ........................ 367/173

* cited by examiner

Primary Examiner—Daniel T. Pihulic
(74) Attorney, Agent, or Firm—James M. Kasischke; Michael F. Oglo; Jean-Paul A. Nasser

(57) ABSTRACT

An acoustic array deployment system and a method are provided. An optical fiber acoustic array has a first end coupled to a projectile housed onboard an underwater vehicle. A second end of the array is coupled to the underwater vehicle. The acoustic array is stored on a spool while the projectile is housed onboard the underwater vehicle. The projectile is launched from onboard the underwater vehicle in a gravitationally downward direction that is not aligned with the underwater vehicle's direction of travel. As a result, the acoustic array is paid out from the spool as the projectile is launched and then sinks. By establishing the line array's broadside beam in a direction that is away from the vehicle and approximately perpendicular to the vehicle's direction of travel, the relative angular difference between the underwater vehicle and target can be used to guide the vehicle towards the target.

19 Claims, 1 Drawing Sheet

ACOUSTIC ARRAY DEPLOYMENT SYSTEM AND METHOD

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to deployment of acoustic arrays underwater, and more particularly to an acoustic array and deployment system and method for deploying an acoustic array from a moving underwater vehicle such as a supercavitating torpedo.

(2) Description of the Prior Art

Unmanned underwater vehicles typically have acoustic array sensing systems mounted in their nose structures. However, the nature of some underwater vehicles precludes the use of such sensing arrangements. For example, a supercavitating torpedo generates a cavitation bubble about the torpedo. The noise generated by the cavitation bubble severely reduces the effectiveness of any acoustic array mounted anywhere on the supercavitating torpedo. Thus, acoustic sensing for a supercavitating torpedo must be accomplished outside of the torpedo's cavitation bubble.

One approach for getting an acoustic array away from a vehicle is to tow it behind the vehicle. In the case of the supercavitating torpedo, this does get the acoustic array physically away from the cavitation bubble. However, since the towed array will be in line with the torpedo and its intended target (that is aligned with the torpedo's direction of travel), the cavitation bubble surrounding the torpedo will tend to mask the target in the acoustic array's endfire beam.

SUMMARY OF THE INVENTION

Accordingly, it is an object of the present invention to provide a method and system for deploying an acoustic array from an underwater vehicle.

Another object of the present invention is to provide a method and system for deploying an acoustic array from a supercavitating underwater vehicle to minimize the effect of the cavitation bubble surrounding the underwater vehicle on the acoustic array.

Other objects and advantages of the present invention will become more obvious hereinafter in the specification and drawings.

In accordance with the present invention, an acoustic array deployment system for an underwater vehicle is provided along with a method for carrying out such deployment. A weighted projectile is housed onboard the underwater vehicle. An optical fiber based acoustic array has a first end thereof coupled to the weighted projectile and has a second end thereof coupled to the underwater vehicle. Means are provided for maintaining the acoustic array in a spooled configuration while the weighted projectile is housed onboard the underwater vehicle. Means are also provided for launching the weighted projectile from onboard the underwater vehicle in a gravitationally downward direction that is not aligned with the underwater vehicle's direction of travel. As a result, the acoustic array is paid out from its spooled configuration as the weighted projectile is launched and then sinks under its own weight. By establishing the line array's broadside beam in a direction that is away from the vehicle and approximately perpendicular to the vehicle's direction of travel, the relative angular difference between the underwater vehicle and target can be used to guide the vehicle towards the target.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
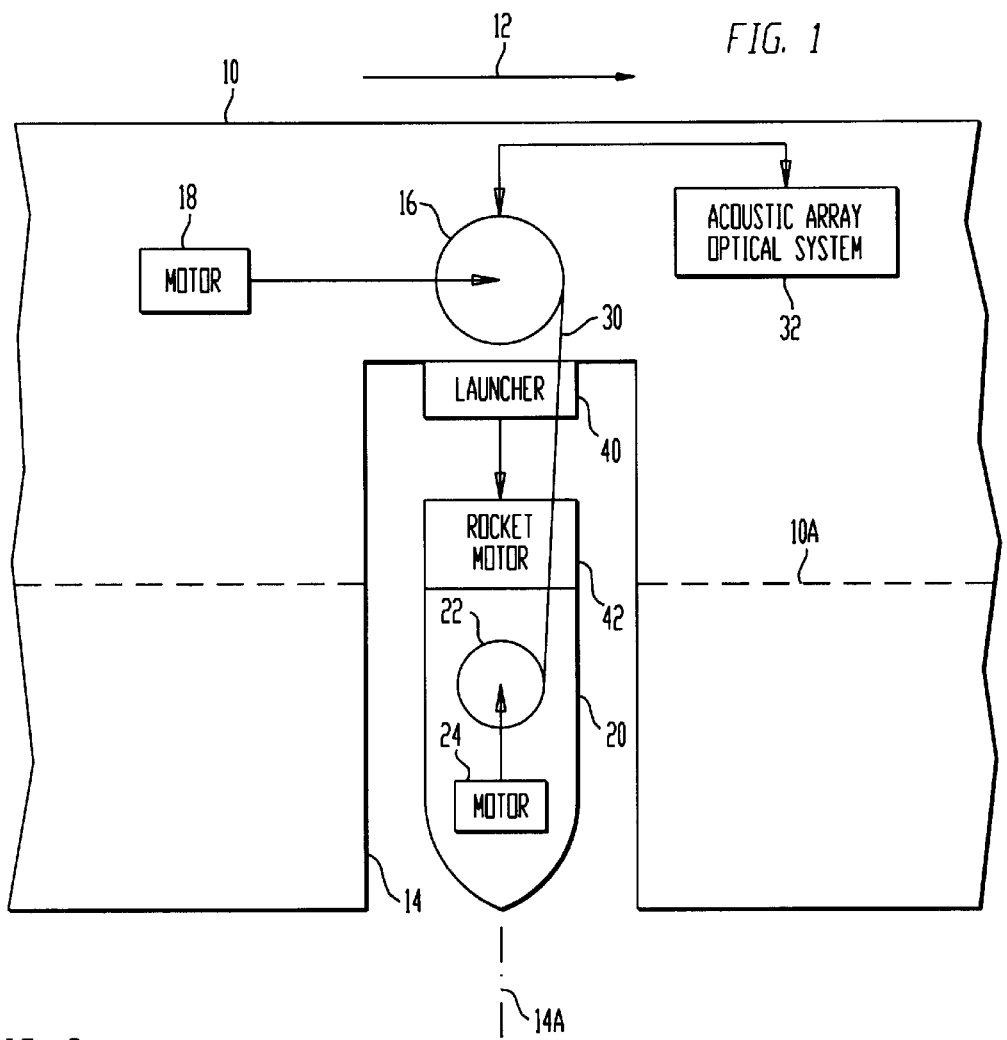
FIG. 1 is a schematic view of a portion of an underwater vehicle housing an acoustic array deployment system in accordance with the present invention.

Referring now to the drawings, and more particularly to FIG. 1, a portion of an underwater vehicle 10 is illustrated. For purposes of the current description, underwater vehicle 10 is assumed to be traveling in the water along a direction of travel indicated by arrow 12. While the type of underwater vehicle 10 is not a limitation of the present invention, the method and system for deploying an acoustic array that will be described herein is particularly useful for a supercavitating underwater vehicle (e.g., a torpedo) that generates a cavitation bubble (not shown) therearound as it moves through the water.

Housed within underwater vehicle 10 is a small weighted projectile 20. More specifically, projectile 20 is housed in a launch tube 14 that is formed in a side of underwater vehicle 10. Launch tube 14 is configured such that its launching axis 14A will typically be approximately perpendicular to a longitudinal axis 10A of underwater vehicle 10 (which is always parallel to direction of travel 12). It is to be understood that launching axis 14A could be offset from strict perpendicularity with longitudinal axis 10A by as much as 5–10° without departing from the scope of the present invention.

As used herein, the term "weighted projectile" is meant to define any body/weight that, after being launched from launch tube 14, will be forcibly propelled through the water and then sink under its own weight. Thus, the particular size/shape/weight of projectile 20 can be adapted for a particular application.

An acoustic array to be deployed by the present invention is maintained in a spooled configuration prior to its deployment. In the present invention, it is preferred for the acoustic array to be constructed from an optical fiber to minimize size and weight considerations. In the illustrated example, the acoustic array is maintained in its spooled configuration using a small spool 22 mounted onboard weighted projectile 20 and a large spool 16 mounted onboard underwater vehicle 10. More specifically, some of an acoustic array 30 is spooled on small spool 22 and some is spooled on large spool 16. Note that either end of acoustic array 30 is coupled to a respective one of spools 16 and 22. Further, the end of acoustic array 30 onboard underwater vehicle 10 will also be optically coupled to an acoustic array optical system 32 as would be understood in the art.

The use of two spools minimizes tension in acoustic array 30 when it is deployed. In addition, where deployment tension in, or deployment speed of, acoustic array 30 is a concern, motors 18 and 24 can be coupled to spools 16 and 22, respectively, to actively pay out acoustic array 30 during deployment thereof. For example, motor 18 must pay out fiber fast enough to make up for the terminal velocity of projectile 20 and the forward velocity of underwater vehicle 10.

Weighted projectile 20 is forcefully ejected from launch tube 14 by means of one or more propulsion systems. For example, a launcher 40 can be installed in launch tube 14 for purposes of supplying a launch force to weighted projectile 20. Launcher 40 can be any type of launcher (e.g., spring-loaded ram piston, hydraulic ram piston, hydraulic pressure-based launcher, pneumatic pressure-based launcher etc.) that applies its launch force to weighted projectile 20 while remaining with underwater vehicle 10. Additionally or alternatively, a rocket motor 42 (or other propulsion means) can be coupled to the aft end of weighted projectile 20. In all cases, the force supplied to weighted projectile 20 should be sufficient to carry it through any cavitation bubble surrounding underwater vehicle 10.

Figure 2:
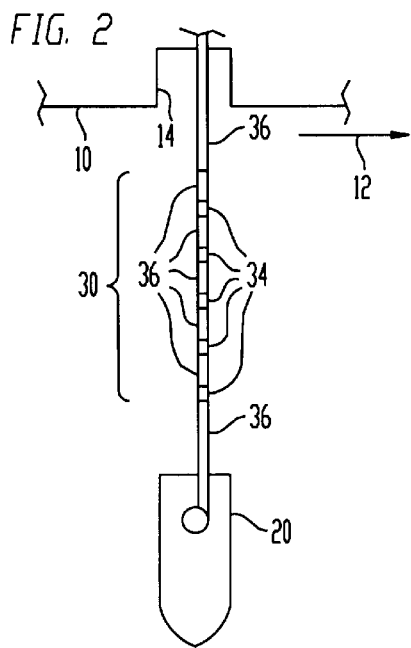
FIG. 2 is a schematic view of a portion of the acoustic array deployment system after the acoustic array has been deployed.

In operation, underwater vehicle 10 moves through the water along direction of travel 12, and is oriented such that launch tube 14 faces downward, i.e., towards the sea floor. When acoustic sensing is desired, weighted projectile 10 is ejected from launch tube 14 in a direction that is substantially aligned with the earth's gravitational pull. The forceful ejection and subsequent sinking of weighted projectile 20 causes acoustic array 30 to be paid out (as shown in FIG. 2) in a direction that, in general, is not aligned with direction of travel 12. Preferably, acoustic array 30 makes an angle with direction of travel 12 that is approximately perpendicular thereto or within approximately 5–10° of such perpendicularity. In this way, the broadside beam of acoustic array 30 is not affected by acoustic noise generated by, for example, a cavitation bubble surrounding underwater vehicle 10.

As mentioned above, acoustic array 30 is preferably an optical fiber-based acoustic array. As such, optical hydrophones 34 are integrated in the array's optical fiber 36 at spaced apart locations therealong. As is known in the art, each of optical hydrophones 34 can be constructed as a Bragg grating or can be configured to produce Rayleigh scattering (at the hydrophone's location) of laser pulses passed along optical fiber 36. The origin of such laser pulses would be acoustic array optical system 32.

The advantages of the present invention are numerous. An acoustic array can now be deployed outside of a cavitation bubble in a direction that allows a target to be resolved irrespective of the noise generated by the cavitation bubble. The substantially vertical line array formed by the present invention should have sufficient vertical directivity to separately resolve both the underwater vehicle and the target in the array's broadside beam. The relative angular difference between the underwater vehicle and target can be used to guide the vehicle towards the target.

Figure 3:
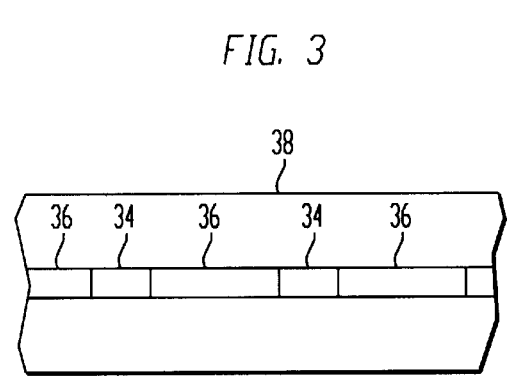
FIG. 3 is an isolated view of a portion of the acoustic array utilizing an amplification coating.

Although the present invention has been described relative to a specific embodiment thereof, it is not so limited. For example, as illustrated in FIG. 3, optical fiber 36 and integrated hydrophones 34 can be encapsulated or coated in a material 38 that amplifies acoustic pressure that impinges thereon. Such coating/encapsulation is disclosed in U.S. Pat. No. 4,979,798, the contents of which are hereby incorporated by reference. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An acoustic array deployment system for an underwater vehicle, comprising:
   a weighted projectile capable of being housed onboard the underwater vehicle;
   an optical fiber based acoustic array having a first end and a second end with said first end being coupled to said weighted projectile and said second end being coupled to the underwater vehicle;
   spooling means for maintaining said acoustic array in a spooled configuration when said weighted projectile is housed onboard the underwater vehicle, said spooling means comprising a first spool mounted onboard said weighted projectile and a second spool mounted onboard the underwater vehicle; and
   ejection means coupled to said weighted projectile for launching said weighted projectile from onboard the underwater vehicle in a gravitationally downward direction that is not aligned with the underwater vehicle's direction of travel, wherein said acoustic array is paid out from said spooling means as said weighted projectile is launched and then sinks under its own weight.

2. An acoustic array deployment system as in claim 1 wherein said acoustic array comprises an optical fiber having a plurality of optical hydrophones integrated therein at spaced apart intervals along said optical fiber.

3. An acoustic array deployment system as in claim 2 wherein each of said plurality of optical hydrophones comprises a Bragg grating.

4. An acoustic array deployment system as in claim 2 wherein each of said plurality of optical hydrophones is configured to produce Rayleigh scattering of laser pulses passed along said optical fiber.

5. An acoustic array deployment system as in claim 1 wherein said ejection means is mounted onboard said weighted projectile.

6. An acoustic array deployment system as in claim 1 wherein said first spool is motorized.

7. An acoustic array deployment system as in claim 1 wherein said second spool is motorized.

8. An acoustic array deployment system as in claim 1 wherein said first spool and said second spool are motorized.

9. An acoustic array deployment system as in claim 1 wherein said ejection means is mounted onboard the underwater vehicle.

10. A method of deploying an acoustic array from a supercavitating underwater vehicle producing a cavitation bubble therearound during movement through the water along a direction of travel, comprising the steps of:
    providing a weighted projectile onboard the underwater vehicle, an optical fiber based acoustic array having a first end and a second end with said first end being coupled to said weighted projectile and said second end being coupled to the underwater vehicle, and spooling means for maintaining said acoustic array in a spooled configuration when said weighted projectile is housed onboard the underwater vehicle; and launching said weighted projectile from onboard the underwater vehicle in a gravitationally downward direction that is not aligned with the underwater vehicle's direction of travel, wherein said weighted projectile is propelled through the cavitation bubble of the underwater vehicle, and wherein said acoustic array is paid out from said spooling means as said weighted projectile is launched and then sinks under its own weight.

11. An acoustic array deployment system for an underwater vehicle, comprising:

a weighted projectile housed onboard the underwater vehicle;

an optical fiber having a plurality of optical hydrophones integrated therein at spaced apart intervals along said optical fiber, said optical fiber having a first end and a second end with said first end being coupled to said weighted projectile and said second end being coupled to the underwater vehicle;

a first spool mounted onboard said weighted projectile and a second spool mounted onboard the underwater vehicle, said first spool maintaining a first portion of said optical fiber in a spooled configuration when said weighted projectile is housed onboard the underwater vehicle and said second spool maintaining a second portion of said optical fiber in a spooled configuration when said weighted projectile is housed onboard the underwater vehicle; and ejection means coupled to said weighted projectile for launching said weighted projectile from onboard the underwater vehicle in a gravitationally downward direction that is not aligned with the underwater vehicle's direction of travel, wherein said optical fiber is paid out from each of said first spool and said second spool as said weighted projectile is launched and then sinks under its own weight.

12. An acoustic array deployment system as in claim 11 wherein each of said plurality of optical hydrophones comprises a Bragg grating.

13. An acoustic array deployment system as in claim 11 wherein each of said plurality of optical hydrophones is configured to produce Rayleigh scattering of laser pulses passed along said optical fiber.

14. An acoustic array deployment system as in claim 11 further comprising a material coating said optical fiber for amplifying acoustic pressure impinging thereon.

15. An acoustic array deployment system as in claim 11 wherein said first spool is motorized.

16. An acoustic array deployment system as in claim 11 wherein said second spool is motorized.

17. An acoustic array deployment system as in claim 11 wherein said first spool and said second spool are motorized.

18. An acoustic array deployment system as in claim 11 wherein said ejection means is mounted onboard the underwater vehicle.

19. An acoustic array deployment system as in claim 11 wherein said ejection means is mounted onboard said weighted projectile.

* * * * *